United States Patent [19]

Pope et al.

[11] Patent Number: 5,335,342
[45] Date of Patent: Aug. 2, 1994

[54] AUTOMATED SOFTWARE TESTING SYSTEM

[75] Inventors: Gregory M. Pope; Jeffrey F. Stone, both of Santa Cruz; John A. Gregory, Redwood City, all of Calif.

[73] Assignee: Tiburon Systems, Inc., San Jose, Calif.

[21] Appl. No.: 707,882

[22] Filed: May 31, 1991

[51] Int. Cl.$^5$ ............................................. G06F 11/00
[52] U.S. Cl. ..................... 395/575; 371/19; 371/69.1
[58] Field of Search ............ 371/19, 68.1, 68.3, 371/69.1; 395/575; 434/118

[56] References Cited

U.S. PATENT DOCUMENTS

| | | | |
|---|---|---|---|
| 3,711,863 | 1/1973 | Bloom | 371/19 |
| 4,423,508 | 12/1983 | Shiozaki et al. | 371/16 |
| 4,533,997 | 8/1985 | Furgerson | 364/200 |
| 4,665,522 | 5/1987 | Lala et al. | 371/36 |
| 4,696,003 | 9/1987 | Kerr et al. | 371/19 |
| 4,772,206 | 9/1988 | Kerr et al. | 434/118 |
| 4,864,569 | 9/1989 | DeLucia et al. | 371/19 |
| 5,086,393 | 2/1992 | Kerr et al. | 364/419 |
| 5,153,886 | 10/1992 | Tuttle | 371/67.1 |
| 5,157,782 | 10/1992 | Tuttle et al. | 395/575 |

OTHER PUBLICATIONS

Heuermann, et al., "Automated test and verification", IBM Technical Disclosure Bulletin, vol. 17, No. 7, Dec. 1974, pp. 2030–2035.
"Automated Testing of Application Programs", IBM Technical Disclosure Bulletin, vol. 28, No. 9, Feb. 1986, pp. 3726–3727.
Pope, et al., "Developing an Adabased Computer-Aided Software Test System", Defense Computing, Jan./Feb. 1988.
"Advanced Test System (ATS) for Software Test", IBM Technical Disclosure Bulletin, vol. 30, No. 9, Feb. 1988, pp. 134–137.

Primary Examiner—Charles E. Atkinson
Attorney, Agent, or Firm—Flehr, Hohbach, Test, Albritton & Herbert

[57] ABSTRACT

An automated software testing system for testing system-under-test resident software without extensive intrusion into the system-under-test hardware or software. A first version of interactive software is executed on the system-under-test. During execution all input signals to the system-under-test such as mouse activities and keystrokes are recorded by the testing system as a script. Additionally, selected system-under-test display images are captured by the testing system. Subsequently, a second version of the interactive software is executed on the system-under-test and the previously recorded script is played back. The images generated by the second version of software are compared to the images generated by the first version of software and the differences are displayed.

10 Claims, 6 Drawing Sheets

AUTOMATED SOFTWARE TESTING SYSTEM

The present invention relates generally to a system for testing software and particularly to methods and systems for automatically testing and comparing versions of software.

BACKGROUND OF THE INVENTION

Software development requires extensive repetitive testing as new versions of the software are produced throughout the development process. With each version comes a repetitive series of tests to determine if the changes made to create the new version have affected the software in an unintended manner. Thus, with each new version an operator must repeat all of the input commands tested on the previous version to ensure that the software still functions as intended.

In addition, software development is accomplished in modules which require complete testing as each new module is added to the software product. Thus repetitive testing is required to ensure that the new module, besides adding the functions it was designed to accomplish, will not detrimentally affect the previous version of the software product.

Until recently the repetitive testing was accomplished by a human operator generating each test command manually. Recent advances in technology have made it possible to record the keystroke input of an operator as the first version of software is tested. Subsequent versions are tested by playing back the previously recorded session. A system of this type is disclosed by Kerr et al. in U.S. Pat. No. 4,696,003, issued Sep. 22, 1987. Another relevant keystroke recording and playback system is the Advanced Test System For Software Test as disclosed in IBM Technical Disclosure Bulletin, Vol. 30, No. 9, Feb. 9, 1988.

Systems which record both the key strokes and mouse activity have recently entered the marketplace. However, these systems rely on intrusive hardware inserted into the system being tested. The additional hardware or software typically provides the testing system access to signals on the command bus within the system under test. This alleviates having to interpret mouse activity and keystroke signals in their unprocessed form. However, intrusion into a system under test is not desirable, it adds cost and is not practical for many systems.

To effectively evaluate a software package, the displayed graphical output of the various versions of software under test must be compared and the differences displayed. Kerr et al., as cited above, discloses a method of comparing stored images to determine differences which may arise in executing various versions of software.

However, certain portions of the display may not be relevant to the software-under-test. It would be advantageous for the operator to specify, during the execution of the first version of the software, which areas of the screen should be compared and which areas of the screen should be excluded from the comparison. It would also be advantageous to display the differences within the included areas as hi-lighted images. Moreover, the comparison should not require the compared images to be identical, but should enable the operator to set comparison tolerances which must be exceeded before a difference is noted.

SUMMARY OF THE INVENTION

The present invention relates to an automated software testing system having a PC based hardware suite and a set of software modules which record all keystrokes, mouse movements and communication lines into and out of a system-under-test. It additionally captures user selected screen images. Subsequently, the recorded signals are replayed to control the system-under-test while it is executing a new version of the software. The resultant screen images are compared to the previously captured images to detect variations, and the variations are displayed.

An object of the present invention is to provide the previously stated capabilities without extensively intruding into the system-under-test.

Another object of the present invention is to provide a software test system which operates with little human intervention after the initial software version test procedure is recorded.

Another object of the present invention is to provide a test system which enables many independently recorded test sessions to be arranged and executed.

Another object of the present invention is to provide a method of selecting areas of the screen images for comparison, and selecting other areas for exclusion from the comparison.

Another object of the present invention is to provide a method for accurately and reproducibly recording mouse movements for subsequent playback.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
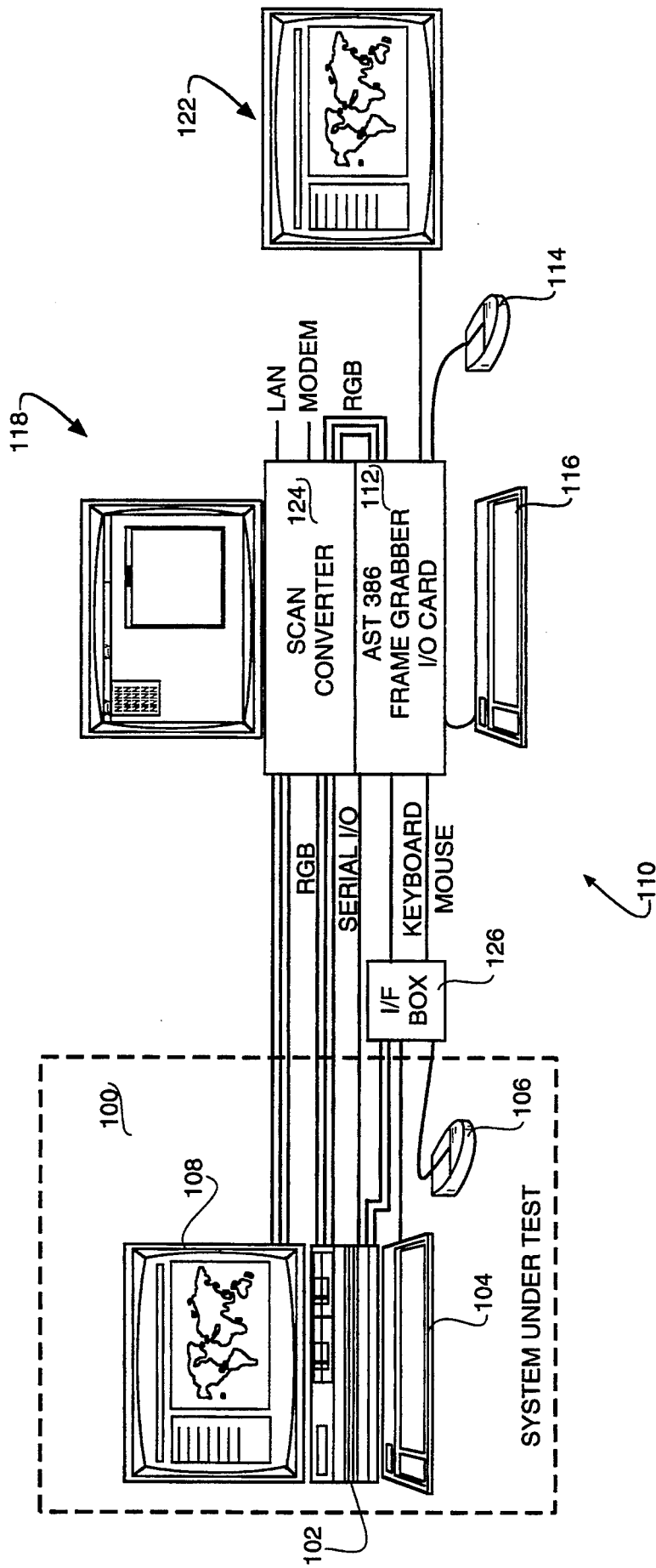
FIG. 1 depicts the preferred embodiment of the present invention.
Figure 2:
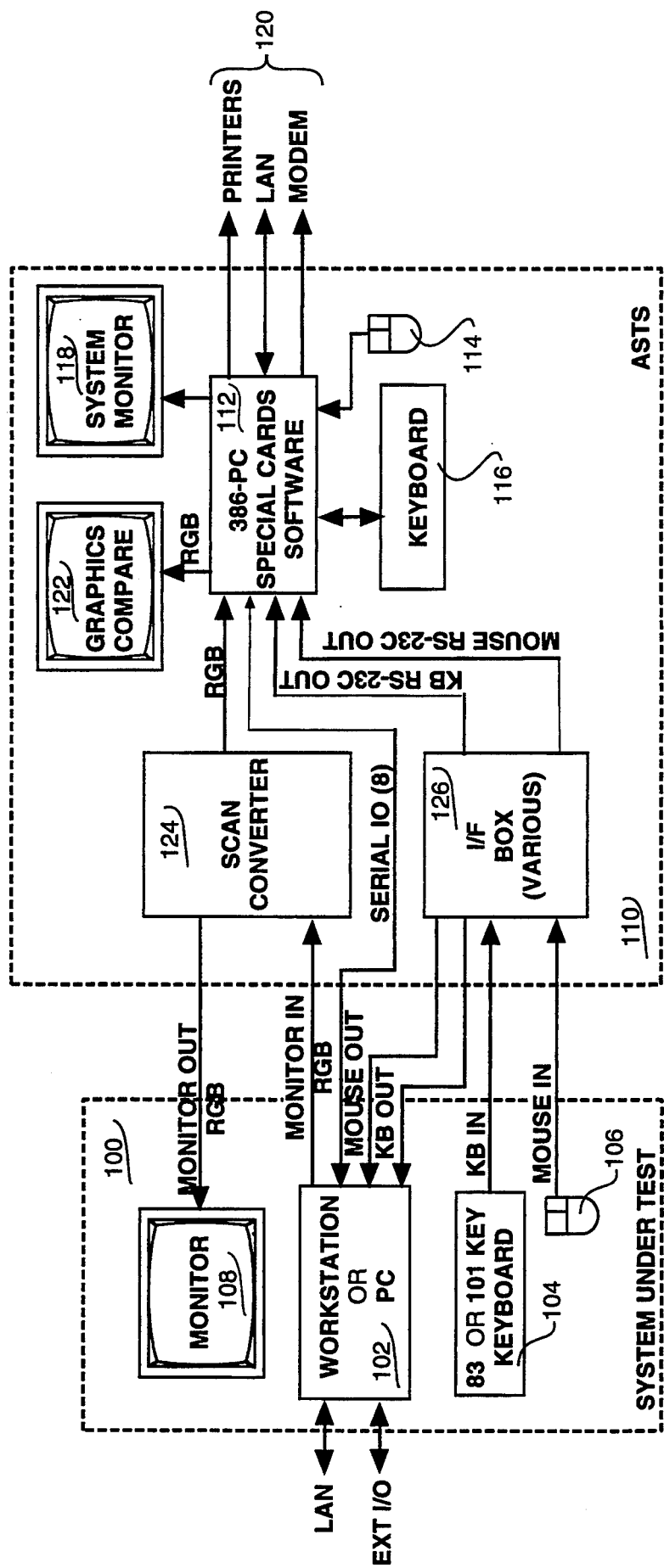
FIG. 2 is a block diagram of the embodiment of FIG. 1.

Referring to FIGS. 1 and 2, there is shown a depiction of a preferred embodiment of the invention and a block diagram of the FIG. 1 preferred embodiment, respectively. The system-under-test (SUT) 100 may be one of the many workstations or personal computers on the market. Typically, a SUT 100 consists of a processing portion 102, a keyboard 104 and mouse 106 for information input, and a monitor 108 for displaying images. Alternatively, the invention is operable in conjunction with any of a mainframe computer's "dumb" terminals to substitute for the keyboard, and monitor the SUT 100 depicted in FIG. 1. Most mainframe computers do not use mice as input devices.

The automatic software test system (ASTS) 110 has as its main component a personal computer 112 using an 80386 microprocessor and running a graphics-based operating system such as Microsoft WINDOWS ™, DOS, UNIX, or VMS. It is foreseeable that the ASTS microprocessor and the operating system may vary depending upon the application and the current state-of-the-art of computer systems.

The computer 112 is accompanied by the standard peripherals; a mouse 114, a keyboard 116, and a monitor 118. Additionally, the computer 112 can be interfaced with a printer, a modem, or a local area network via ports 120.

The computer 112 includes a special interface card having a graphics adapter and a graphics processor on a single printed circuit card. A variety of cards capable of accomplishing these functions are available. A suitable example is the ATVista Videographics Adapter incorporating a 32-bit graphics processor from Texas Instruments (TMS34010) and 4 Mbytes of RAM onto a single card.

To facilitate displaying processed graphics, a second monitor 122 is provided. Many monitors and driver cards are available. An example is the Electrohome ECM 1312U High Resolution Color monitor.

As a portion of the ASTS 110, but external to the computer 100 is a scan converter 124. The scan converter 124 intercepts the RGB video signal from the SUT 100 video driver card within the SUT computer 102 as it is being transferred to the SUT monitor 108. The signal is both passed to the monitor 108 in the same form as it was when intercepted and is passed to a converter. In general, a scan converter 124 matches the scan rate of the SUT 100 video card output to the scan rate of the graphics processor as well as providing a composite video output. Since various SUT 100 video signals will have frame sizes and scan rates depending upon the type of monitor used, e.g., VGA, EVGA, CGA, EGA, or monochrome, the scan converter 124 is used to enable the ASTS 110 to be flexible and adaptable to various SUT monitors.

Many varieties of scan converters are available. For example, the Photron FSC-6400AL Frame Scan Converter generates composite (VBS), separate (RGB), and component video from an analog RGB input. The separate video or RGB signal is passed to the graphics processor in the computer 110 for image processing and storage.

The ASTS 110 includes a specially designed interface box 126 which accomplishes the mouse activity and keyboard capture function. During the capture mode, the interface box 126 converts the mouse activity and key stroke signals into standard RS-232C signals before passing them to the computer 112 for processing and storage. Conversely, upon playback the interface box 126 translates the ASTS RS-232C based commands into signals understandable by the SUT 100 as mouse and keyboard inputs. The interface box 126 must be compatibly designed to interface with the SUT 106; therefore, each SUT must have a specific interface box to much its signal format and connector pin arrangement, This is the only subsystem of the ASTS which is not inherently adaptable to various SUTs.

The ASTS 110 is attached to the serial ports of the SUT 100 to record and playback these signals as well. Therefore, communications using the local area network, printer signals, scanner inputs, etc. are monitored by the ASTS 110 via a multi-port intelligent serial board located within the computer 112. An example of an applicable serial board is the DigiCHANNEL COM/8i which has an on-board 80188 processor and is capable of interfacing with 8 serial ports simultaneously.

As depicted in FIG. 1, the previously described ASTS 110 hardware does not require intrusive electronics to be inserted into the SUT 100. In fact no special SUT hardware or software is necessary at all. The ASTS attaches to the SUT at standard interface connections, e.g., mouse to computer, keyboard to computer, computer to display. The ASTS interprets the signals available at these interfaces for storage and display in its hardware without any processing of these signals in the SUT.

Figure 3:
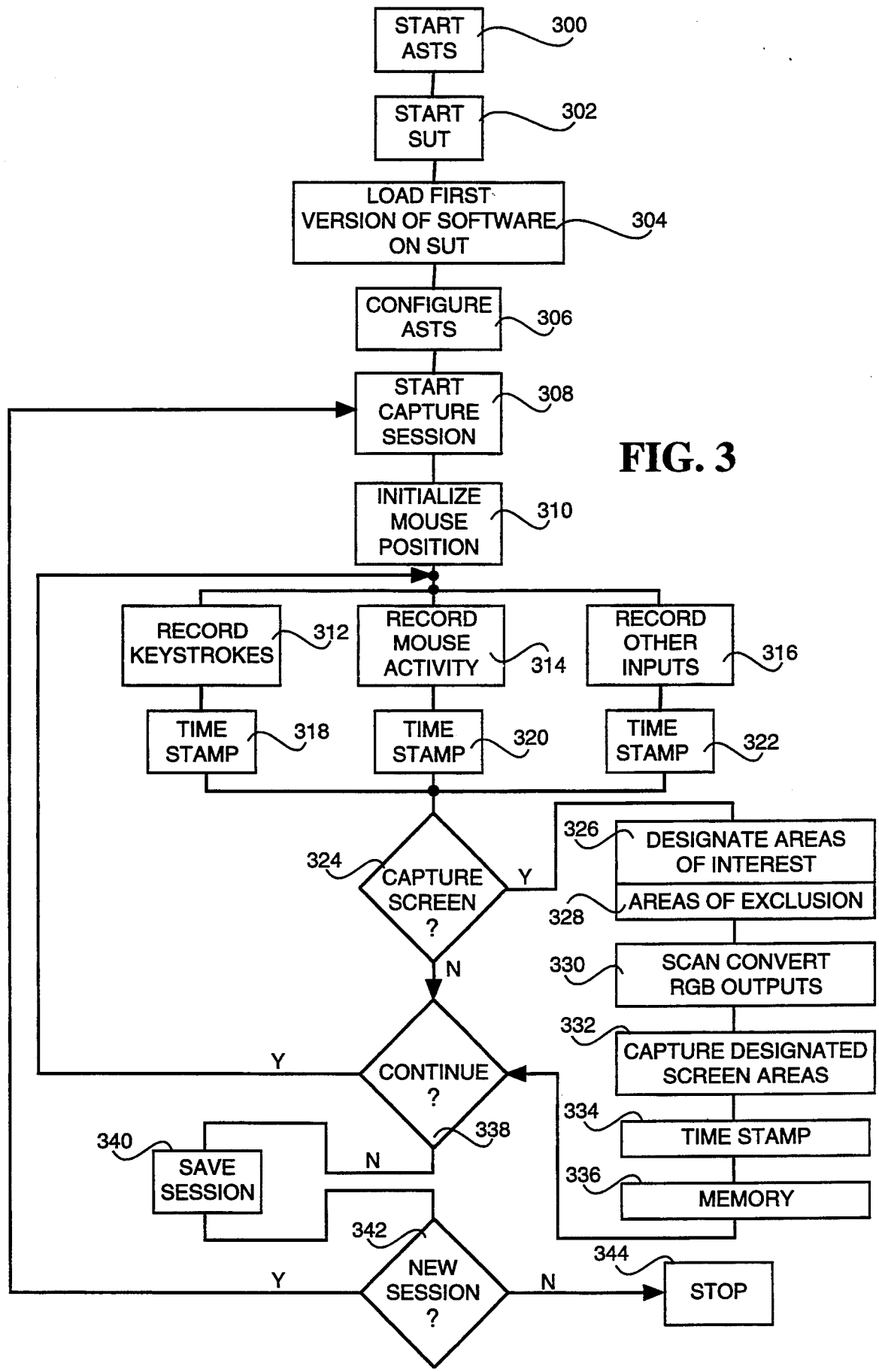
FIG. 3 is a flow chart of the method by which script files are generated by the invention.

Referring to FIG. 3, there is shown a flow chart of the operation of the ASTS to generate test session script files. These files, in general, contain the recorded key strokes, mouse movements and other mouse activity, and I/O signals. Each event recorded is time tagged.

Additionally, the operator may capture and store the screen images displayed on the SUT graphics monitor by depressing a special key combination to activate the sample and store algorithm. To facilitate a user friendly man-machine interface, the ASTS uses the Microsoft WINDOWS TM operating system. Therefore, most commands are menu driven.

The SUT and ASTS are started at steps 300 and 302. The original version (first) of the software is loaded into the SUT at step 304. At step 306, the ASTS configuration function is activated to enable the operator to set the port settings for the mouse, keyboard and comms ports; adjust the image compare sensitivity level, color tolerance, and alarm threshold; and create path settings to designate where captured image files will be stored. The image compare sensitivity, color tolerance, and alarm threshold parameters will be discussed below in connection with the playback and compare process.

The capture session is begun at step 308. The objective is to record all mouse activity, keystrokes, other I/O activity and selected images in the ASTS. A capture session generates a script file containing the recorded activities. To begin the session, the mouse pointer on the SUT monitor is placed in a reproducible state, e.g., the pointer is placed in the upper, left corner of the screen. From this point on, the SUT is operated in a normal manner to execute the software. Every keystroke, mouse activity and other input signal is recorded and time stamped by the ASTS at steps 312 through 322.

The mouse activities including dragging, clicking, and double clicking are each recorded. As discussed previously, the interface box which enables the ASTS to record the mouse activities varies with the specific SUT used. Most workstations require little in the way of alterations in the mouse and keyboard signal. Mainly, the interface box provides compatible pin arrangements for the interconnecting cables and may provide level shifting circuitry to make the commands RS-232 compatible. This circuitry is simple and well known in the art.

Additionally, some applications merely require special cabling. For instance, some workstations use RS-232 signals generated by the mouse and keyboard; however, the mouse is connected to the keyboard and the combined signals, mouse and keyboard, are passed to the SUT computer via a single cable. To address this arrangement, the ASTS interface box is wired to merely split the mouse and keyboard signals into separate, respective cables for ASTS use.

Contrastingly, personal computer mouse activity and keystroke signals have two components, a data signal and a clock signal. The data/clock signal format is converted by the interface box to RS-232 format for use by the ASTS. This format conversion algorithm and hardware has been widely published and is well known in the art.

Subsequent to properly formatting the signals, the ASTS time stamps and stores the keyboard data that is indicative of the key depressed. Additionally, the mouse activity, i.e., depressed mouse button, and the mouse movement data, i.e., digital representation of the $\Delta X$ and $\Delta Y$ signals, are time stamped and stored.

In the configuration file there is a special field called "mouse search" which affects the mouse capture function. When it is used, it improves the accuracy of the reproduced mouse movements for SUTS having non-repeatable mouse movements. In other words, after the $\Delta X$ and $\Delta Y$ signals are recorded, upon playback the cursor will not maintain the same course as was recorded. The mouse search function slows the mouse movements to two pixels per recorded movement. This slow rate of change is maintained no matter how fast the operator moves the mouse and permits the recording algorithm to accurately track the mouse's motion. Upon playback, the slow mouse motion is repeated and the mouse non-repeatability problem is minimized.

Figure 6A:
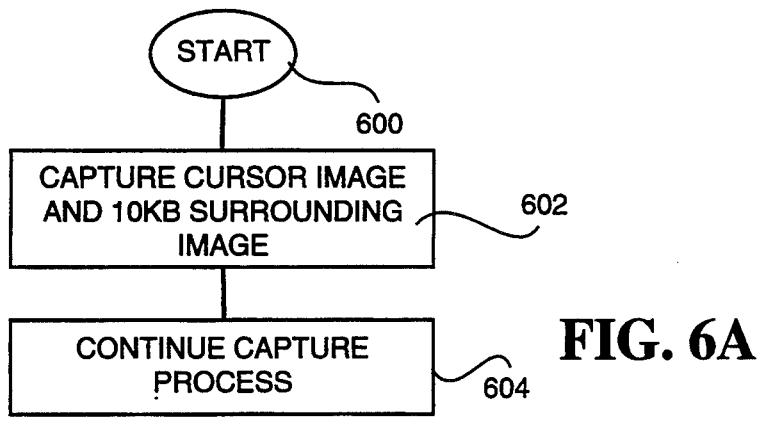
FIGS. 6A and 6B are further flow charts.
Figure 6B:
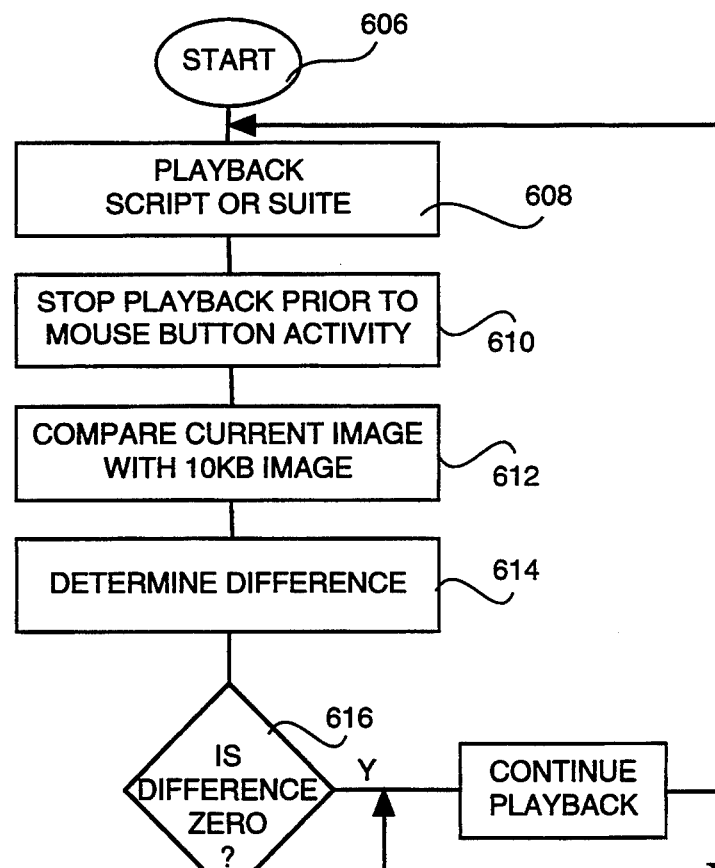
Figure 6B:
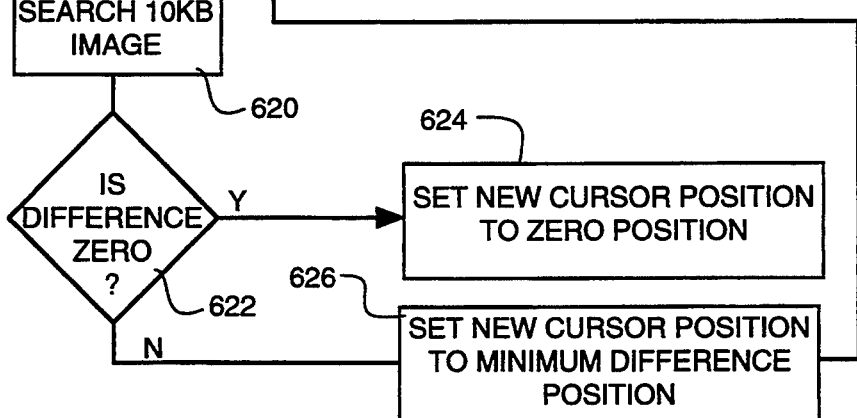

To enhance accuracy in determining mouse position, the algorithm also captures a small 10 kbyte image file of the cursor and its surrounding environment each time the mouse button is depressed. This capture process is depicted in FIG. 6A as steps 600 through 604. Upon playback as depicted in FIG. 6B, the playback process is halted just before the mouse button would be depressed, step 610, and the 10 kByte captured image is compared to the current image of the position of the mouse cursor, step 612. The two images are exclusively ORed by the graphics processor card, step 614. Any differences between the images remain, i.e., represented by digital "1", while common areas disappear, represented by digital "0". If the 10 kByte area is not completely blank, then the cursors are known not to be aligned, step 616. If the area is blank, the playback process continues at step 618.

To correct for the error, the ASTS scans the 10 kByte area with its cursor in a spiral pattern until a perfect match is realized at step 620, 622, and 624. The new cursor position is used as the cursor position for continuing the playback process. If a match is not found, the position of least difference is used, step 626. The ASTS places the cursor in the matched position, or in the nearest position and continues with the playback procedure. The mouse search process is only used when a SUT has a non-repeatable mouse algorithm. If the SUT mouse positioning is repeatable, there is no need to use the mouse search field in the configuration file because, upon playback, the mouse will repeat perfectly.

In operation, the first time the mouse is clicked during the capture process, the ASTS freezes the keyboard and mouse input from the SUT and displays a copy of the SUT's display on the ASTS graphics monitor. A white mouse cursor appears on the ASTS monitor. The operator must position the white cursor, by moving the ASTS mouse, to overlay the SUT cursor image and click the ASTS mouse button. This initializes the mouse position.

At appropriate points during the execution of the software under test, the operator may decide to capture a screen image. At step 324, when a desired image is displayed on the SUT monitor, the operator depresses a special key combination on the ASTS keyboard, e.g., CNTRL-G, to initiate the image capture process. The captured image is displayed on the ASTS graphics monitor.

The system will query the operator via the ASTS monitor to designate areas of the image which are to be analyzed, step 326, and to designate areas of the image to exclude from analysis, step 328. Designation is accomplished by circumscribing the desired areas on the ASTS graphics display monitor with rectangles. Up to 100 rectangles may be used to designate inclusive and exclusive areas. The areas may be overlapped and/or nested. For example, commonly excluded area is the on screen clock which, upon playback, will always be indicated as an image difference unless excluded from the comparison.

Subsequently, the images are scan converted, step 330, and captured by the image processor board, step 332. The image is time stamped 334 and stored in memory 336.

Afterward, the system either continues 338 to add more recorded input information and images to the file or saves the session at 340. The operator may start a new session 342 and build one or more scripts or stop 344.

The recorded scripts can be grouped to provide a suite of test commands. A test control language (TCL) enables the operator to loop the scripts or use rudimentary if-then-else statements to provide test strategy flexibility. The suites are generated using the notepad function of WINDOWS ™.

Figure 4:
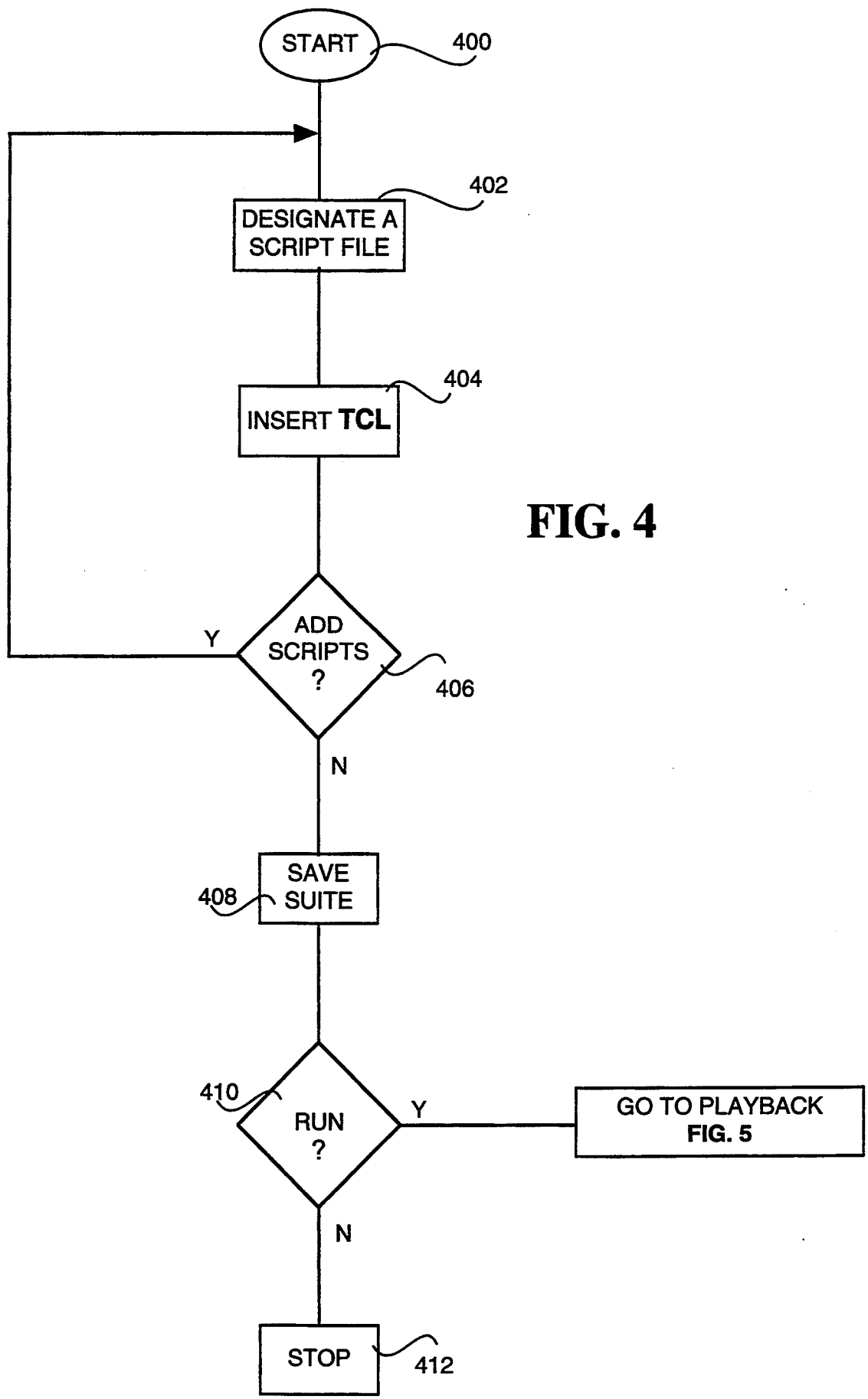
FIG. 4 is a flow chart of the method by which test suites are generated.

Referring to FIG. 4, there is depicted a flow chart of the process to generate test command suites. At step 402, the operator designates a script file and adds TCL at step 404 to control the script activation. At step 406, the operator may choose to stop the suite production process at this point or add another script and more TCL until a lengthy suite is produced.

For example, a suite which executes a series of scripts sequentially would have the following form:

```
do
    script 1
    script 2
    if pass
        script 3
    else
        script 4
    endif
end
```

The following example will execute the scripts between the "repeat" and the "end" statements 100 times unless script 1 fails at some point during the 100 repetitions.

```
repeat 100
    script 1
    if fail
        abort
    else
        script 2
        script 3
        if pass
            script 1
        endif
    endif
end
```

The TCL if-statements having optional condition statements, e.g., if pass, if fail, etc., refer to the outcome of the image comparisons accomplished by the ASTS during the playback operation. The usefulness of these statements will become obvious when the playback mode of operation is discussed.

Once a suite is generated and saved as a file, the ASTS playback mode is enabled. In this mode, the ASTS repeats each of the recorded mouse activities, keystrokes and other input signals which were previously recorded. In addition, at the points in time when the screen images were captured during the first SUT execution, the ASTS will again capture the SUT images. The new images are compared to the previously recorded images and the differences are displayed.

Figure 5:
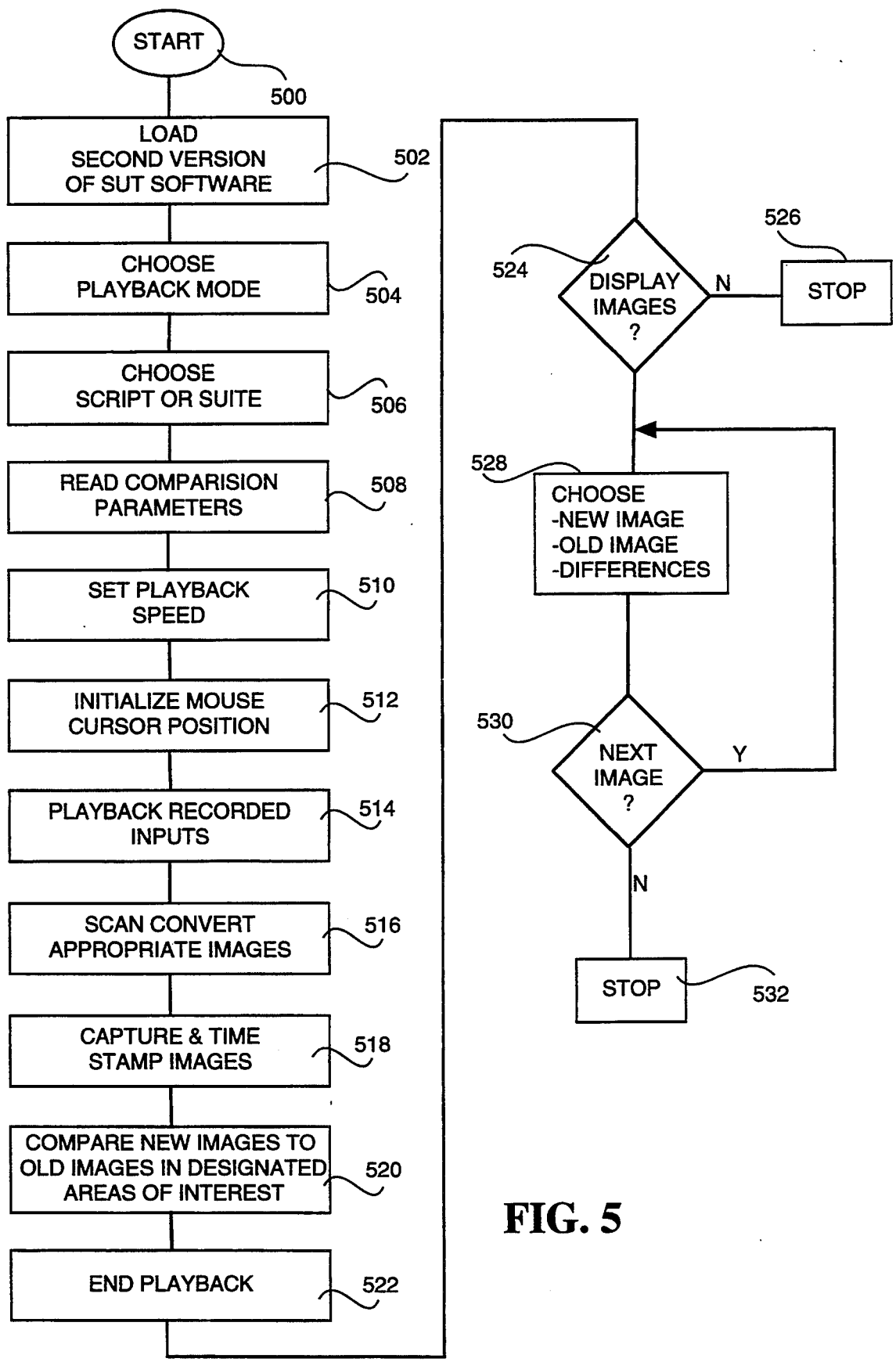
FIG. 5 is a flow chart of the method by which the test scripts or suites are replayed and the resultant images compared to the previously captured images.

FIG. 5 is a flow chart depicting the playback process in detail. Typically, as indicated in step 502, a new version of software is loaded into the SUT. However, new software may not be the only variation that is tested by the ASTS. The SUT hardware may have been altered, but the software remains the same. In this situation, the ASTS would be used to validate the new hardware configuration. The typical case, i.e., a new version of software, is exemplary of the operation of the invention. However, this should not be construed as limiting the invention in any manner.

Next, step 504, the operator chooses the desired playback mode. The modes are designated PLAY, IPLAY, and LEARN. In the PLAY mode, the ASTS repeats each keystroke and mouse activity in the script without pause. Errors are logged and the images having differences are captured and stored automatically. In the IPLAY mode, the operator must interact with the ASTS at each identified error or difference in images. The operator decides to continue the execution or abort based upon the displayed error or image difference. In the LEARN mode, the originally stored screen images captured during the previous execution are replaced with the new images each time a difference in the images is detected. Thus, the ASTS stored images are updated automatically whenever the latest SUT software version changes the screen images.

After loading the new software on the SUT and choosing the playback mode, the operator must choose a previously generated script or suite, step 506, to execute and control the playback sequence.

Each script, as discussed previously, includes a configuration file which among other items includes the image comparison parameters. These comparison parameters include an alarm threshold, a color sensitivity parameter and a pixel resolution parameter. Adjustment of each enables the operator to tailor the image comparison parameters to the current test.

The alarm threshold setting determines the number of pixels that must be different between two images before the alarm is triggered, setting off an indicator "beep", and saving the offending image for subsequent display.

The color sensitivity setting specifies how large a difference any one of the three pixel colors must exhibit before a pixel is considered different from another pixel. Each pixel has a red, blue, and green component that has a color sensitivity that ranges from 1 to 31. Typically, a sensitivity above 7 will overcome the background noise.

The pixel resolution parameter is used to inform the ASTS how many pixels of a captured image to sample and compare. In other words, the ASTS will sample 1 out of n pixels, where n is the pixel resolution, and compare the sampled number of pixels in the playback image to the identical number of pixels in the previously captured image. The lower the resolution the more pixels are examined resulting in higher sensitivity to differences. However, the greater the sensitivity requires more processing time during the compare process.

Returning to FIG. 5, the previously described parameters are read by the ASTS during step 508. At step 510, the speed of the playback execution is set. Typically, the rate of playback is identical to the rate at which the SUT was operated during the capture mode. Alternatively, the speed can be set to playback the previously recorded activities at a rate faster or slower than the capture rate.

Variable rates are also accommodated by the ASTS. For instance, if during capture the SUT had to access data stored on a disc or from a LAN, the access time may not be the same when playback is accomplished. The script can be generated to include a synchronization command and synchronization screen image, such that the ASTS, upon reaching the synchronization command during playback, will wait until the new image matches the stored synchronization image before continuing the playback process. The matched screen images indicates that upon playback the SUT accessed the necessary information and generated the same results. Under this algorithm, the time that the SUT requires to access the necessary data is irrelevant because the ASTS will wait until the execution is complete.

To initialize the ASTS playback process, at step 512 the mouse cursor on the SUT monitor is placed in the initialization position used during recording, e.g., the upper, left corner of the SUT monitor. Additionally, the operator must ensure that the image on the screen at the start of the playback session is the same as the image on the screen when the capture session was begun.

At step 514, the ASTS begins playback of the recorded signals. At each time that a command to capture the previous image was recorded, the ASTS captures a new image from the SUT as it executes the new version of software in this automatic manner. The image scan conversion and capture occurs at steps 516 and 518.

The new captured screen images are compared to the old images at step 520. An image representing the differences, if any, is stored. Remember, the comparison process is only applied to the screen areas designated to be of interest during the capture session. The comparison functions are accomplished by the graphics processor card in the ASTS computer. The graphics processor card exclusively ORs the 1 out of n pixels set in the configuration file resolution field. The exclusive-OR process indicates the pixels in each of the images being compared which are different. Then it applies the previously set comparison parameters, i.e., color tolerance and threshold alarm, to the difference image.

When playback of the chosen suite or script ends at step 522, the ASTS display will notify the operator of the number of images captured and the number of images which failed the comparison criteria, i.e., exceeded the parameters set in the configuration file.

At step 524, the operator indicates whether an image is to be displayed or the process should be stopped 526. At step 528, the operator may choose to display a new image, an old image, or an image showing the old image with highlighted areas depicting the differences between the new and old images. The images are designated by a number corresponding to the order in which each was captured. In addition, the operator can apply a zoom function to any displayed image to enlarge the image to enhance the resolution. At step 530, the operator may choose a new image for display or stop the program 532.

Using various suite arrangements, software test engineers can generate repeatable test data for the software under test. New versions can automatically be tested to ensure that the old functions incorporated into the new software remain functional. Moreover, the new functions can be quickly and easily scripted and appended to the existing test suites to provide comprehensive testing of the new software version.

The ASTS provides an integrated software development environment by also providing advantageous software test development tools. A software requirements Analysis tool is incorporated into the ASTS to enable test engineers to derive a test procedure directly from the test requirements documentation. This function is accomplished using standard word processor application software and Hypertool in the microsoft WINDOWS TM environment. In general, the test requirements are read into the word processor from a floppy, a test scanner, imported from a Computer Aided Software Engineering (CASE) environment, or are typed in manually. The requirements document is then searched for keywords indicative of a test requirement, i.e., shall. A Hypertool "button" is placed at each of the designated requirements.

The test can be designed from the stipulated requirements to assure full coverage and predict expected results. A standard spread sheet application program is used. It is linked to the "buttons" in the requirements document. By selecting the "buttons" for a desired test procedure, the operator generates an easily understandable test matrix in spread sheet form.

Using the matrices as a guide, the test engineer performs each test on the SUT while the ASTS records each operation and specified screen image. The test matrices can be linked and expanded by generating test suites using the test control language.

As bugs are found during the playback process, the test engineer can generate bug reports on the integral word processor. The failed images and the test procedures used can be easily appended to the bug report to fully document the software failures as they occur.

Additionally, the ASTS can predict SUT quality level using the Musa-Okumoto method of maturity analysis. Upon initializing this routine, the test engineer is requested to answer a series of questions including:

How many hours per day will the software run?
How many days per week will the software run?
How many source lines of code?
How many bugs per thousand lines of code has been historically found?
How many priority 1 bugs can be tolerated per month?
How many priority 2 bugs can be tolerated per month?
How many priority 3 bugs can be tolerated per month?

The answers to these questions coupled with the resources allocated to the software development effort are used to predict an estimated software delivery date. The information is updated as the software testing proceeds in order to refine the estimated delivery date and monitor the effectiveness of the testing procedure.

As can be seen from the previously discussed routines, the ASTS provides a fully integrated test platform, With this single system, software (and hardware) test procedures can be quickly designed and modified. The ASTS provides an optimal, automatic testing system which can be designed to test the SUT on a 24 hour basis without human interaction. The results can be easily and clearly documented in a bug report and the maturity analysis routine provides insight into the effectiveness of the testing procedure.

An operational alterative includes recording operator physiological information during the capture session. Data which are indicative of stress such as heart rate and perspiration can be recorded. The recorded data is subsequently compared to data taken using a new version of software or hardware having improved ergonomic attributes. If the improvements are successful the operators stress level should be reduced. The ASTS can accomplish a comparison of the stress levels as a result of environmental changes. Recordation of extrinsic factors is accomplished via various standard sensors producing digital output signals which are captured by one or more channels of the I/O card in the ASTS computer.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for testing a system-under-test having a screen means for displaying images and one or more input devices, the steps comprising:

executing a first version of system-under-test resident software;

recording a script containing input signals from said input device;

capturing specified screen images as displayed on said screen means;

executing said script on a second version of said system-under-test resident software, said second version of said software being different from said first version of said software;

capturing screen images of said second version corresponding to said specified screen images;

designating specific exclusion areas and inclusion areas on said screen images;

determining differences between said different versions of said software as appear in said designated inclusion areas; and identifying the location relative to one of said screen images, of differences detected.

2. The method of claim 1 wherein said step of recording includes the step of recording human operator physiological data.

3. The method of claim 1 wherein said step of executing said script is accomplished without human intervention.

4. The method of claim 1 wherein said step of determining said differences is accomplished by comparing said specified screen images as said first version of software was executed to corresponding ones of said captured screen images as said second version of software was executed.

5. The method of claim 4 wherein said step of displaying further includes the step of identifying a graphical image highlighting the differences in captured screen images of said first version as compared to said second version.

6. The method of claim 1 wherein said step of recording a script includes the steps of recording a script containing signals from a mouse and signals from a keyboard.

7. The method of claim 1 wherein said step of executing said script on a second version of software includes the step of executing a suite on a second version of software comprised of one or more scripts connected by test control language.

8. A method for testing a system-under-test having a screen means for displaying images, a non-repeatable mouse, and a keyboard, the steps comprising:
- executing a first version of system-under-test resident software;
- recording a script containing signals from said keyboard and $\Delta X$, $\Delta Y$ and button activity signals for said mouse;
- capturing a cursor image and a segment of screen image surrounding said cursor displayed on said screen means at each occurrence of mouse button activity;
- capturing specified screen images as displayed on said screen means;
- executing said script on a second version of said system-under-test resident interactive software until a previously recorded mouse button activity is to be replayed, said second version of said software being different from said first version of said software;
- comparing a current cursor image with said captured segment of said screen image surrounding said cursor;
- determining a difference between said captured cursor image and said current image;
- proceeding with said script if no difference is determined;
- searching said captured segment with said current cursor until said difference is eliminated;
- determining a new cursor position where said difference is eliminated;
- proceeding with said script from said new cursor position when said new cursor position which eliminates the difference is determined;
- determining a new cursor position where said difference is minimized if elimination of said difference is not realized;
- proceeding with said script from said new cursor position when said new cursor position which minimizes the difference is determined;
- capturing screen images displayed on said screen means by execution of said second version of said software;
- determining differences between said different versions of said interactive software; and
- identifying the location relative to one of said screen images, of differences detected.

9. The method of claim 8 wherein said step of comparing cursor images includes the step of performing an exclusive OR function on said current cursor image and said captured image on a pixel by pixel basis.

10. A method for testing a system-under-test having a screen means for displaying images and one or more input devices, the steps comprising:
- executing a first version of system-under-test resident software;
- recording a script containing input signals from said input devices;
- capturing specified screen images as displayed on said screen means;
- specifying exclusion areas and inclusion areas of said captured screen images;
- executing said script on a second version of said system-under-test resident interactive software, said second version of said software being different from said first version of said software;
- capturing screen images displayed on said screen means by execution of said second version of said software;
- comparing said inclusion areas of said screen images captured during execution of said first version of said software to said screen images captured during execution of said second version of said software;
- determining difference arising from said comparing step;
- displaying the differences; and
- graphically highlighting said differences.

* * * * *